(12) United States Patent
Kerber et al.

(10) Patent No.: US 11,167,738 B2
(45) Date of Patent: Nov. 9, 2021

(54) METHOD FOR IMPROVING THE CONTROL BEHAVIOR OF AN ELECTRONIC MOTOR VEHICLE BRAKING SYSTEM

(71) Applicant: Continental Teves AG & Co. oHG, Frankfurt (DE)

(72) Inventors: Henning Kerber, Schwalbach am Tannus (DE); Mario Roszyk, Werheim (DE); Dieter Burkhard, Bingen-Buedesheim (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 15/309,866

(22) PCT Filed: Apr. 10, 2015

(86) PCT No.: PCT/EP2015/057892
§ 371 (c)(1),
(2) Date: Apr. 24, 2017

(87) PCT Pub. No.: WO2015/169540
PCT Pub. Date: Nov. 12, 2015

(65) Prior Publication Data
US 2017/0217410 A1  Aug. 3, 2017

(30) Foreign Application Priority Data
May 9, 2014  (DE) .......................... 102014208796.1

(51) Int. Cl.
*B60T 8/1761* (2006.01)
*B60T 8/1763* (2006.01)

(52) U.S. Cl.
CPC ...... *B60T 8/17616* (2013.01); *B60T 8/17636* (2013.01); *B60T 2210/124* (2013.01); *B60T 2210/14* (2013.01); *B60T 2230/04* (2013.01)

(58) Field of Classification Search
CPC .............................. B60T 8/175; B60T 8/1755
See application file for complete search history.

(56) References Cited

U.S. PATENT DOCUMENTS

2003/0137190 A1*  7/2003  Burkhard ................ B60T 8/173
                                                      303/11
2005/0110343 A1*  5/2005  Gronau ................... B60T 13/52
                                                      303/116.2

(Continued)

FOREIGN PATENT DOCUMENTS

CN  1364125 A  8/2002
CN  1675095 A  9/2005

(Continued)

OTHER PUBLICATIONS

International Search Report and Written Opinion dated Jul. 3, 2015 from corresponding International Patent Application No. PCT/EP2015/057892.

(Continued)

*Primary Examiner* — Imran K Mustafa

(57) ABSTRACT

The invention relates to a method for improving the control behavior of an electronic motor vehicle braking system which comprises at least a slip control function. Wheel dynamic information which is evaluated as a criterion for initiating a control intervention is used individually for each wheel and is compared with control thresholds for a pressure reduction phase, a pressure maintenance phase, and a pressure buildup phase for generating corresponding braking torques by means of a vehicle braking system. According to the invention, the expected acceleration change of a vehicle wheel is calculated from a pressure change at said wheel, said pressure change being caused by a control intervention; the actual acceleration change at the vehicle wheel, said acceleration change being caused by the pressure change, is determined from measured wheel speeds as wheel dynamic (Continued)

information; and the control behavior of the slip control is adapted when the actual acceleration change deviates from the expected acceleration change by a defined degree such that the deviation is minimized.

7 Claims, 1 Drawing Sheet

(56) References Cited

U.S. PATENT DOCUMENTS

| | | | | |
|---|---|---|---|---|
| 2009/0063000 | A1* | 3/2009 | Kodama | B60W 30/18118 |
| | | | | 701/75 |
| 2015/0081170 | A1* | 3/2015 | Kikuchi | B60G 17/06 |
| | | | | 701/37 |

FOREIGN PATENT DOCUMENTS

| | | |
|---|---|---|
| DE | 19926672 A1 | 3/2000 |
| DE | 10006012 A1 | 9/2000 |
| DE | 10107454 A1 | 12/2001 |
| DE | 102007019099 A1 | 10/2008 |
| DE | 102009024996 A1 | 12/2009 |
| DE | 102009027482 A1 | 1/2010 |
| DE | 102008041528 A1 | 3/2010 |
| DE | 102011086151 A1 | 5/2013 |
| DE | 102012205573 A1 | 10/2013 |
| DE | 102012217121 A1 | 3/2014 |
| DE | 102011005285 B4 | 8/2015 |
| EP | 2662555 A1 | 11/2013 |
| WO | 89/11409 A1 | 11/1989 |
| WO | 01/96160 A1 | 12/2001 |

OTHER PUBLICATIONS

Chinese Office Action dated Jun. 19, 2018 for corresponding Chinese Patent Application 201580024330.7.

Korean Office Action dated May 21, 2018 for corresponding Korean Patent Application 10-2016-7031187.

* cited by examiner

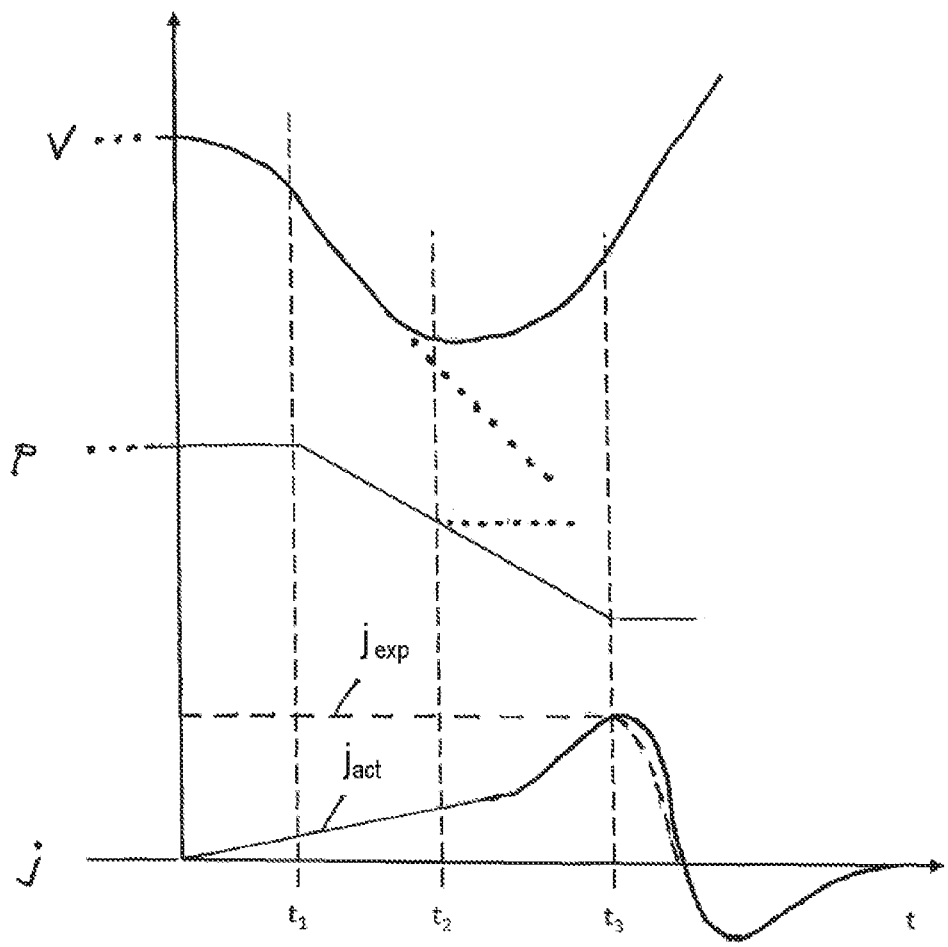

METHOD FOR IMPROVING THE CONTROL BEHAVIOR OF AN ELECTRONIC MOTOR VEHICLE BRAKING SYSTEM

TECHNICAL FIELD

The invention relates to a method for improving the control behavior of an electronic motor vehicle braking system.

BACKGROUND

Systems for preventing the vehicle wheels from locking (anti-lock braking systems, ABS), for controlling traction slip of the driven wheels (traction-slip control system, ASR) are known and comprise slip control.

To prevent the wheels from locking when braking, the anti-lock braking system analyzes the turning performance of the individual wheels and determines a reference vehicle speed therefrom. In addition, the wheel slip is established and analyzed individually for each wheel. Threshold values of the wheel slip are generally predetermined for controlling the wheel slip, which define the use of the control.

In known methods for the braking control of vehicles, an attempt is made to prevent overbraking—that is to say an excessive slip between the wheels of the vehicle and the highway surface. The slip optimum is approx. 7 to 15% slip depending on the tire type. "Slip onset" is understood to mean exceeding this optimum, wherein the tire also loses its cornering stability characteristics.

A corresponding controller should therefore be able to achieve the set control target long-term. If a control deviation still persists after a certain time, the controller recontrols, for example by means of further pressure-decrease phases or pressure-increase phases, in order subsequently to reduce the control deviation. The temporal behavior is determined by the parameterization of the controller.

In the case of a well applied controller, large control deviations normally only occur if something "unexpected", that is to say a fault, occurs and the motor vehicle braking system does not behave as expected owing to this fault.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An imminent large control deviation is detected before the occurrence thereof, so that the occurrence of such a control deviation is prevented or at least the duration of the occurrence of such a control deviation is shortened by means of a timely control intervention.

A method for improving the control behavior of an electronic motor vehicle braking system, comprises at least the function of a slip control, in which analyzed wheel dynamics information is used for each individual wheel as a criterion for initiating a control intervention and is compared with control thresholds for a pressure-decrease phase, a pressure-maintenance phase and a pressure-increase phase for generating corresponding braking moments by means of a vehicle braking system, is characterized in that the expected acceleration change at a vehicle wheel is calculated from a pressure change at this wheel effected by means of a control intervention, the actual acceleration change effected by the pressure change at the vehicle wheel is determined from measured wheel speeds as wheel dynamics information, and in the case of a deviation of the actual acceleration change from the expected acceleration change by a defined amount, the control behavior of the slip control is adjusted in such a manner that the deviation becomes minimal.

Using this method the quality of the slip control can be improved substantially, i.e. the depth of slip onsets is reduced, in particular the duration of the presence of a large control deviation is shortened substantially.

The relevant variables in this method are on the one hand the pressure change effected by a control intervention, which leads to a corresponding change of the braking moment, and on the other hand the change in the wheel acceleration effected by this pressure change or by this braking-moment change, wherein the change of the wheel acceleration. That is to say, viewed mathematically, the derivative of the wheel acceleration or the second derivative of the speed is generally termed jerk and constitutes a differential variable which is calculated in the control algorithm from the difference of two adjoining acceleration values.

Starting from the pressure change effected by a control intervention, the acceleration change initiated thereby. That is to say, the expected acceleration change, is calculated, a braking pressure model being used for this. Using this braking pressure model, first the braking pressure acting on the vehicle wheel is calculated and the expected acceleration change is calculated therefrom, further parameters, such as the highway coefficient of friction, coefficient of friction of the lining of the brake disk, etc. also being used for the latter. This expected acceleration change is then compared with the actually beginning acceleration change determined from the wheel speed as the second derivative thereof.

According to an embodiment of the invention, the defined amount is given by a tolerance band defined around the value of the expected acceleration change. If the value of the actual acceleration change lies outside this tolerance band, the deviation is too large, so that a control intervention becomes necessary.

An alternative embodiment of the invention provides that the defined amount is given by a value range, the values of which are compared with the quotient of the actual acceleration change and the expected acceleration change.

According to a further development of the invention, the control behavior is adjusted by means of a change of the controller amplification factors and/or by means of a change of the controller frequency and/or by means of a change in the pulse height relating to the pressure request.

As the signals for calculating the expected acceleration change and the signals for determining the actual acceleration change must physically relate to the same point in time, it is provided according to a development that the pressure change signals used for determining the expected acceleration change and the wheel speed signals used for determining the actual acceleration change are temporally synchronized to one another.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 shows the curves occurring at a vehicle wheel for the speed v, the braking pressure p and the expected and actual acceleration change, which represents a jerk value j as a differential variable.

DETAILED DESCRIPTION

The following is based on an ABS control of a motor vehicle braking system using an ABS controller, using which the braking behavior of the vehicle wheels of a vehicle is controlled and an excessive slip is prevented in the process.

FIG. 1 shows a section from such an ABS control of a vehicle wheel, which is in an unstable phase, that is to say in a braking phase with slip onset.

Thus, at time $t_1$, a pressure-decrease phase is introduced by the ABS controller, with the consequence that the braking pressure p and thus also the wheel speed v decreases in accordance with the representation according to FIG. 1.

On the basis of the pressure change at the vehicle wheel, an expected acceleration change is calculated as jerk value $j_{exp}$ from the gradient of the pressure p by means of a braking pressure model. As the pressure p for $t<t_1$ and $t>t_3$ is constant, the value zero results for the expected acceleration change $j_{exp}$. With the start of the pressure decrease, that is to say shortly after the time $t_1$, this calculated signal $j_{exp}$ changes to a positive value, which remains constant due to the constant gradient of the pressure until the end of the pressure decrease at time $t_3$, in order to subsequently drop again to zero.

The actual acceleration change is determined as jerk value $j_{act}$ and calculated from the second derivative of wheel speed v. As long as the speed curve v is curved to the right (concave), the actual jerk $j_{act}$ shows negative slope values. The $j_{act}$ curve becomes a positive slope if the speed curve v transitions to a left curvature (convex), as shown in FIG. 1 FIG. 1 shows a left curvature (convex) from time $t_1$ to time $t_3$ and a right curvature (concave) after time $t_3$. Thus the curve $j_{act}$ shows a positive slope from time $t_1$ to time $t_3$ negative slope after time $t_3$.

During the entire ABS control, the actual jerk value $j_{act}$ is compared with the expected jerk value $j_{exp}$.

Generally, these two variables $j_{exp}$ and $j_{act}$ only differ slightly within a predetermined amount, i.e. the ABS control behaves as expected.

However, if the situation illustrated in FIG. 1 by way of example, that the difference between these two values $j_{exp}$ and $j_{act}$ exceeds a defined amount at time $t_2$, occurs, this means that the acceleration change $j_{act}$ that is set is substantially smaller than the expected acceleration change $j_{exp}$.

The defined amount is given by a tolerance band defined around the value of the expected acceleration change $j_{exp}$. A fault is assumed if the actual acceleration change $j_{act}$ lies outside this tolerance band. Therefore, a large control deviation is imminent, which may lead to a slip onset which will last for a long time and can only be corrected over a plurality of control loops.

The cause of such a fault, that is to say the deviation of the actual acceleration change $j_{act}$ from the expected acceleration change $j_{exp}$ beyond the defined amount may for example lie in the wheel load decreasing, a decreasing highway coefficient of friction being present (due to a change in the highway surface) and/or the tire coefficient of friction decreasing because of the slip. The cause may also lie on the actuator side of the vehicle braking system, for example a smaller coefficient of friction of the lining may be present than was assumed during the calculation of the expected jerk value $j_{exp}$, as a result of which the braking-moment decrease is actually smaller than expected. The defined amount for detecting a fault may also be specified by a value range, the values of which are compared with the quotient of the actual acceleration change $j_{act}$ and the expected acceleration change $j_{exp}$. If this quotient lies outside this value range, a fault is assumed.

If a deviation of the actual acceleration change $j_{act}$ from the expected acceleration change $j_{exp}$ by the defined amount detected in the above-mentioned manner is then present, the ABS controller intervenes and carries out a correction at time $t_2$, in that for example by means of a parameter switch, the pressure request is corrected such that the pressure decrease is continued in a timely manner and consequently at a time $t_3$, the actual jerk value $j_{act}$ follows the expected jerk value $j_{exp}$ within the defined amount, as is illustrated in FIG. 1. From this time $t_3$, the deviation between these two values $j_{exp}$ and $j_{act}$ is only slight and therefore no longer lies outside the defined amount.

Also illustrated in FIG. 1 is the situation where an early extension of the pressure-decrease phase is not carried out in spite of the deviation of the two variables $j_{exp}$ and $j_{act}$ lying outside the defined amount. The pressure decrease would then be ended at time $t_2$ (cf. FIG. 1, braking pressure curve p, illustrated dashed), with the consequence that the slip also increases further, that is to say the slip onset is extended (cf. FIG. 1, speed curve v, illustrated dashed). The ABS control would only react to this slip onset with a pressure decrease at a later point in time, that is to say after a decrease pause, with the consequence that the speed v would fall further after the time $t_2$.

However, using the method according to the invention, the pressure decrease is continued or even amplified because of the deviation between the expected jerk value $j_{exp}$ and the actual jerk value $j_{act}$ lying outside the defined amount.

In the case of a deviation of the two jerk values $j_{exp}$ and $j_{act}$ lying outside the defined amount, the control behavior of the ABS controller can also consist in changing the controller amplification factors, particularly the I part (also the other parts), reducing the pause time of the control, that is to say increasing the control frequency or changing the pulse height.

When determining or calculating the variables $j_{exp}$ and $j_{act}$ it is to be ensured that the associated signals with regards to the pressure change and the acceleration change are synchronized to one another, and that they do not physically relate to the same point in time, even if they are calculated simultaneously in the ABS controller.

As the mathematical derivation in the ABS controller is for the most part determined computationally by means of a differentiation between the respective signal variable at the current point in time and the signal variable at a preceding point in time, there is a time delay here which adds up over multiple derivations. The actually "oldest" signal is therefore relevant during the synchronization and older values of the physically newer signals must be made available by means of intermediate storage. If one of the signals used is filtered, the other signals used are correspondingly also to be filtered in the same way.

The above-described exemplary embodiment relates to the case of "pressure decrease", in order to allow re-acceleration. Naturally, it is also valid for the case of "pressure increase", in order to limit the re-acceleration.

The illustrated method is suitable not only for ABS control, if the vehicle wheel is in the unstable region of the µ-slip curve, but also generally for a slip control in the unstable region of a vehicle wheel.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A method for improving the control behavior of a slip control function for an electronic motor vehicle braking system, comprising:
    initiating a control intervention based upon analyzed wheel dynamics information for each individual wheel of the vehicle;
    measuring a pressure of the braking system at each individual wheel;
    calculating an expected acceleration change (jerk value $j_{exp}$) at each wheel from a pressure change at that wheel effected by the control intervention;
    determining an actual acceleration change (jerk value $j_{act}$) effected by the pressure change at the wheel from measured wheel speeds as wheel dynamics information; and
    determining a deviation of the actual acceleration change from the expected acceleration change, wherein the control behavior of the slip control is adjusted when the deviation exceeds a defined amount.

2. The method as claimed in claim 1, wherein the defined amount is based upon a tolerance band defined around the value of the expected acceleration change.

3. The method as claimed in claim 1, wherein the defined amount is based upon a value range, wherein the values of which are compared with the quotient of the actual acceleration change and the expected acceleration change.

4. The method as claimed in claim 1, further comprising adjusting the control behavior by one of: a change of the controller amplification factors; a change of the controller frequency; or a change in the pulse height relating to the pressure request.

5. The method as claim in claim 1, wherein the pressure change signals for determining the expected acceleration change and the wheel speed signals for determining the actual acceleration change are temporarily synchronized to one another.

6. The method as claim in claim 5, wherein calculating the expected acceleration change at each wheel from the pressure change at that wheel effected by the control intervention, and determining the actual acceleration change effected by the pressure change at the wheel from measured wheel speeds as wheel dynamics information do not physically relate to a same point in time.

7. The method as claim in claim 1, wherein calculating the expected acceleration change at each wheel from the pressure change at that wheel effected by the control intervention, and determining the actual acceleration change effected by the pressure change at the wheel from measured wheel speeds as wheel dynamics information do not physically relate to a same point in time.

* * * * *